(No Model.)
J. C. REED.
PORTABLE FOUNTAIN SHOWER BATH.
No. 305,847. Patented Sept. 30, 1884.
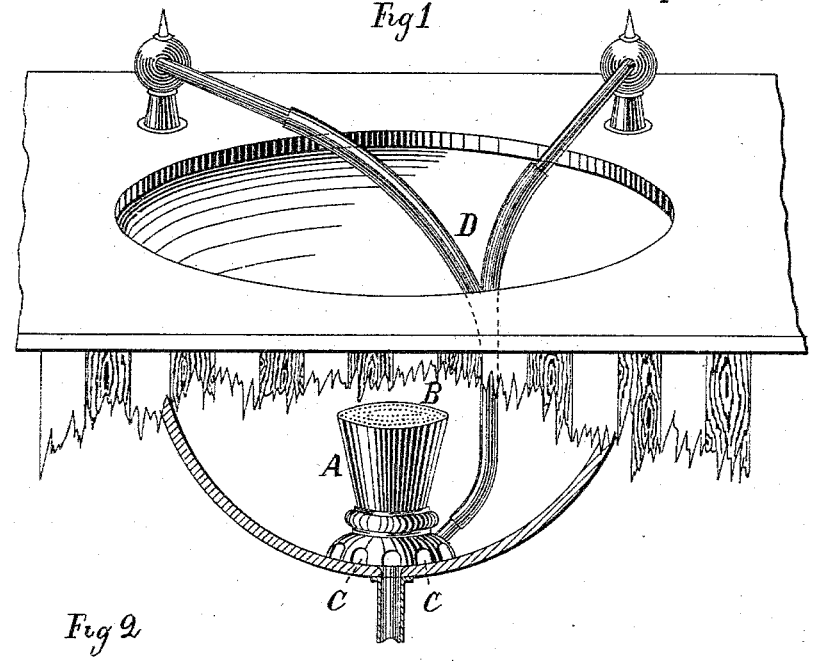
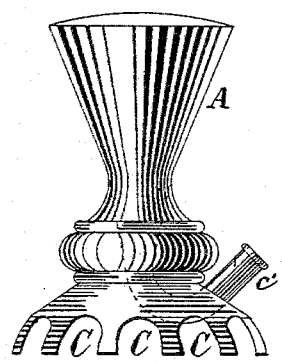
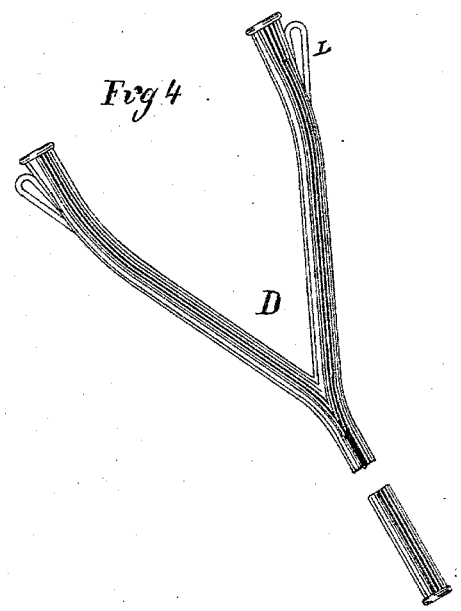
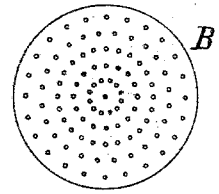
Witnesses
Inventor

UNITED STATES PATENT OFFICE.

JAMES C. REED, OF NEW YORK, N. Y.

PORTABLE FOUNTAIN SHOWER-BATH.

SPECIFICATION forming part of Letters Patent No. 305,847, dated September 30, 1884.

Application filed February 5, 1883. (No model.)

*To all whom it may concern:*

Be it known that I, JAMES C. REED, a citizen of the United States, residing at the city, county, and State of New York, have invented a new and useful Improvement in Portable Fountain Shower-Baths, of which the following description, taken in connection with the accompanying drawings, is a specification.

The object of this invention is to provide a simple and convenient device to be used within an ordinary wash-bowl or other vessel for showering the posterior parts; and in order that others may understand and practice my invention, I will first proceed to describe the construction and operation of the same, and subsequently to point out in the claim its novel features.

In the drawings, Figure 1 represents a perspective view, partly broken, of an ordinary stationary wash-stand with my invention shown as applied for use; and Figs. 2, 3, and 4, side and plan views of the several parts detached.

Similar letters of reference refer to similar parts in the several figures.

The stationary wash-stand shown in Fig. 1 is provided with the usual fixtures and pipe-connections for admitting, releasing, and regulating the flow of water, and also with my improved device, which is placed directly over the waste-pipe connections and coupled with a short rubber tube to the supply-faucet. This device is composed of a hollow piece of metal, A, which may be configured to any desired design, its top or cap B being perforated, so as to deliver the water in a shower, and its base serrated, as shown at C C C, to form a communication with the inclosed waste-pipe. The inlet-pipe C' passes to the interior of the device and extends upward, as shown in the dotted lines, Fig. 2, the outer or opposite end projecting far enough to receive and hold the end of the rubber tube D, that leads from the faucet or water-supply. This rubber tube is constructed in a conical form at the outer end, so as to conform to fixtures or faucets of varying size, and is also provided with one or more loops, L, to facilitate its connection, as shown, for example, in Fig. 4. In its application to a stationary stand containing a hot and cold water supply, the rubber tube is bifurcated and coupled with each faucet, as shown in Fig. 1, so that the temperature of the bath may be regulated to the degree desired.

In the use of this invention, as illustrated in Fig. 1, for example, the device is placed in the center of the bowl, the rubber tube being of sufficient length to allow the faucets to be operated without displacing the connected fountain, the bather assuming a sitting posture upon the bowl and regulating the force and temperature of the water in the usual manner of operating the faucets.

The invention consists of but two parts, one of which (the rubber tube) can be wound about the other and the whole conveniently carried in a pocket-case or hand-satchel.

The device may be used with a common wash-bowl, the water-supply in this instance being obtained from an elevated tank, the bathing operation continuing until the showering-cap B is submerged, when the bowl may be emptied and the operation repeated.

This invention not only supplies a most convenient device for operation in an inaccessible situation, but also applies the water in a direct shower, which in aggravated cases of piles is very desirable.

Having thus fully described my invention, I claim—

As an improved article of manufacture, a portable fountain attachment consisting of the hollow stand A, provided with a perforated cap at its discharge-orifice, a serrated base for waste-passage, and a supply-pipe connection, substantially as and for the purpose specified.

JAMES C. REED.

Witnesses:
CHAS. EDGAR MILLS,
C. L. BEAMAN.